G. GUNTHER.
Flower-Basket.
No. 48,171. Patented June 13, 1865.
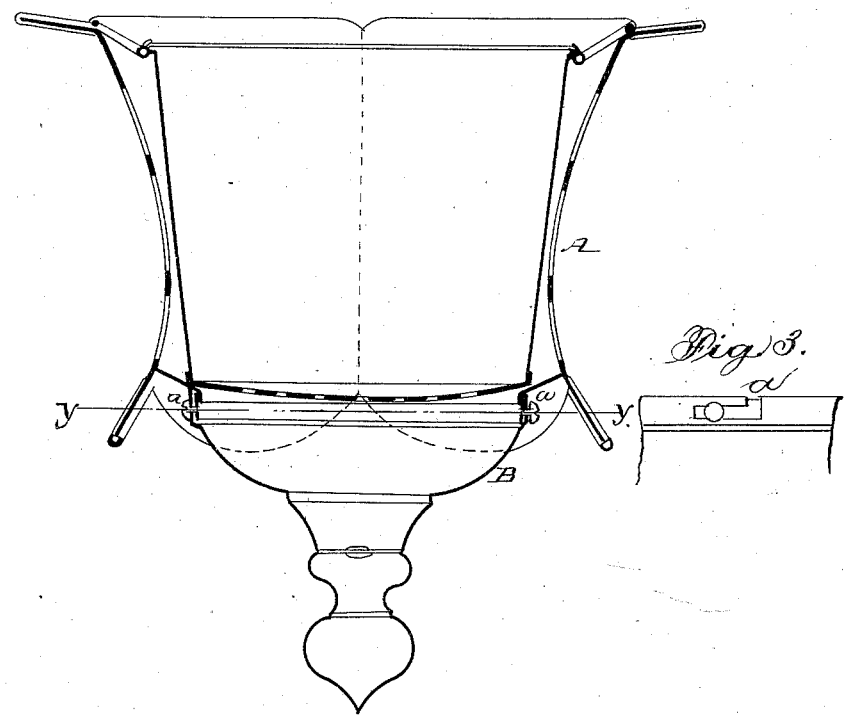
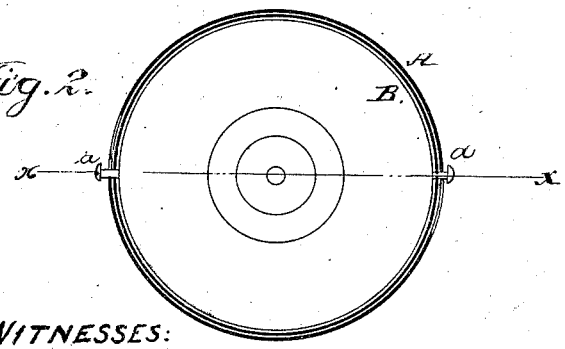

UNITED STATES PATENT OFFICE.

G. GUNTHER, OF NEW YORK, N. Y.

IMPROVEMENT IN FLOWER-BASKETS.

Specification forming part of Letters Patent No. 48,171, dated June 13, 1865.

*To all whom it may concern:*

Be it known that I, G. GUNTHER, of No. — William street, in the city, county, and State of New York, have invented a new and Improved Flower-Basket; and I do hereby declare that the following is a full, clear, and exact description thereof, which will enable others skilled in the art to make and use the same, reference being had to the accompanying drawings, forming part of this specification, in which—

Figure 1 represents a vertical central section of this invention, the line $x\ x$, Fig. 2, indicating the plane of section. Fig. 2 is a horizontal section of the same, taken in the plane indicated by the line $y\ y$, Fig. 1. Fig. 3 is a detached elevation of the slotted rim, showing the manner of fastening the cup to the basket.

Similar letters of reference indicate like parts.

This invention consists in a flower-basket with a detachable cup or bottom in such a manner that water or other impurities accumulating in the lower part of the basket can be readily and easily removed without injury to the roots of the plant or plants growing in said basket.

Flower-baskets are generally made of sheet metal in various forms and shapes, and arranged to be suspended from a cord tied to three or more places of its rim. In all baskets of this kind heretofore manufactured the bottom is made solid with the body of the basket, and in order to get access to said bottom it is necessary to remove the pot containing the plant or plants growing in the basket, or if no pot is used the entire basket must be cleaned out. In either case the plant or plants are liable to be injured, for even where a pot is used the roots find their way out through the perforations in the bottom of the pot and they cling to the sides of the basket, and when the pot is removed they are torn or broken, or the upper parts of the plant are entwined with the basket, so that the pot cannot be taken out without tearing or breaking the same. These disadvantages are overcome by my invention, according to which the bottom B of the basket A is made detachable. It is attached by an ordinary lantern-fastening, $a$, as shown in Fig. 3 of the drawings, or it may be connected in any other suitable manner. The body of the basket is made in the usual manner, and in any desired form or shape.

By these means easy access can be had to the bottom part of the basket, and the bottom can be removed without disturbing the plant or plants, so that the same can be kept clean and free from moisture, which, in flower-baskets of the ordinary construction, causes the same to rust out, and also is liable to produce a bad smell.

I claim, and desire to secure by Letters Patent, as a new article of manufacture—

A flower-basket, A, with a detachable bottom, made substantially as set forth.

G. GUNTHER.

Witnesses:
M. M. LIVINGSTON,
C. L. TOPLIFF.